United States Patent
Khintsitskiy et al.

(10) Patent No.: US 9,792,895 B2
(45) Date of Patent: Oct. 17, 2017

(54) SYSTEM AND METHOD FOR USING PRIOR FRAME DATA FOR OCR PROCESSING OF FRAMES IN VIDEO SOURCES

(71) Applicant: ABBYY Development LLC, Moscow (RU)

(72) Inventors: Ivan Khintsitskiy, Moscow (RU); Andrey Isaev, Moscow Region (RU); Sergey Fedorov, Moscow (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 22 days.

(21) Appl. No.: 14/863,512

(22) Filed: Sep. 24, 2015

(65) Prior Publication Data
US 2016/0171329 A1 Jun. 16, 2016

(30) Foreign Application Priority Data

Dec. 16, 2014 (RU) ................................. 2014150944

(51) Int. Cl.
*G06K 9/32* (2006.01)
*G06K 9/00* (2006.01)
(Continued)

(52) U.S. Cl.
CPC .......... *G10L 13/043* (2013.01); *G06K 9/3233* (2013.01); *G06K 9/3258* (2013.01);
(Continued)

(58) Field of Classification Search
CPC ..... G10L 13/086; G10L 13/043; G10L 13/04; G06K 9/3233; G06K 9/3258; G06K 2209/01
(Continued)

(56) References Cited

U.S. PATENT DOCUMENTS

| 5,583,949 A * | 12/1996 | Smith | ............... G06K 9/481 |
|---|---|---|---|
| | | | 382/199 |
| 2002/0037104 A1 * | 3/2002 | Myers | ............. G06K 9/3258 |
| | | | 382/187 |

(Continued)

FOREIGN PATENT DOCUMENTS

KR    EP 1569162 A1 *  8/2005  ............. G06K 9/325

OTHER PUBLICATIONS

Zhen et al. "An Efficient Video Text Recognition System." 2nd International Conference on Intelligent Human-Machine Systems and Cybernetics, Aug. 26, 2010, pp. 174-177.*

*Primary Examiner* — Jon Chang
(74) *Attorney, Agent, or Firm* — Lowenstein Sandler LLP

(57) ABSTRACT

Disclosed are systems, methods and computer program products for using prior frame data for OCR processing of frames in video sources to detect natural language text therein. An example includes receiving a frame from a video source and retrieving prior frame data associated with the video source. The OCR-processing includes using prior frame data to detect blobs similar to blobs described in the prior frame data; using detected similar blobs to detect in the frame character candidates similar to character candidates described in the prior frame data; using detected similar character candidates to detect in the frame text candidates similar to text candidates described in the prior frame data; and using detected similar text candidates to detect in the frame text strings similar to text strings described in the prior frame data.

36 Claims, 9 Drawing Sheets

(51) Int. Cl.
 *G06T 7/00* (2017.01)
 *G10L 13/04* (2013.01)
 *G10L 13/08* (2013.01)

(52) U.S. Cl.
 CPC ............ *G10L 13/04* (2013.01); *G10L 13/086* (2013.01); *G06K 2209/01* (2013.01)

(58) Field of Classification Search
 USPC ........................................................ 382/182
 See application file for complete search history.

(56) References Cited

U.S. PATENT DOCUMENTS

| | | | | |
|---|---|---|---|---|
| 2002/0051575 | A1* | 5/2002 | Myers | G06K 9/3258 382/202 |
| 2006/0112390 | A1* | 5/2006 | Hamaoka | G06F 9/5066 718/102 |
| 2013/0177203 | A1* | 7/2013 | Koo | G06K 9/00671 382/103 |
| 2013/0259137 | A1* | 10/2013 | Kuusela | H04N 19/423 375/240.24 |
| 2014/0112527 | A1* | 4/2014 | Nister | G06K 9/3266 382/103 |
| 2015/0161474 | A1* | 6/2015 | Jaber | G06K 9/52 382/203 |
| 2015/0319510 | A1* | 11/2015 | Ould Dellahy, VIII | H04N 21/8545 725/32 |

* cited by examiner

SYSTEM AND METHOD FOR USING PRIOR FRAME DATA FOR OCR PROCESSING OF FRAMES IN VIDEO SOURCES

CROSS REFERENCE TO RELATED APPLICATIONS

The present application claims the benefit of priority under 35 USC 119 to Russian Patent Application No. 2014150944, filed Dec. 16, 2014; the disclosure of which is herein incorporated by reference in its entirety for all purposes.

FIELD OF TECHNOLOGY

The present disclosure relates generally to the field of optical character recognition (OCR) processing for video, and more specifically to systems and method for using prior frame data for OCR processing of frames in video sources.

BACKGROUND

One use of optical character recognition (OCR) is recognizing text present in a video source, such as a video recording, or a live video captured by a user with a video camera, a mobile device equipped with video capturing capabilities, etc. The text present in the video source is usually present on an object being video captured, such as a page of text, a sign on the street, a restaurant menu, etc. Once the text presence is detected, its information can be used in the future. The detected text can be recognized and/or used for video compression or any other future uses. The recognized text can be further read and converted into audio, using one of a variety of existing text-to-speech technologies for people having difficulties reading the text. The recognized text can also be translated into a different language immediately upon the capture, so that the user can read or listen (using a text-to-speech technology) to a translation of the text as it is being captured by the camera pointing at the text in the foreign language.

The processing for video can be implemented by simply applying any of the existing document layout analysis technologies to each sequential individual frame or to each frame in a selection of video frames in the video source. However, this approach is too slow and/or too wasteful in terms of processing resources and power consumption, because it fails to utilize the redundancy present in most realistic video capture scenarios. Accordingly, there is a need to improve effectiveness and efficiency of the processing of video sources. To illustrate the present disclosure, the example video frames will be further used for character recognition (OCR).

SUMMARY

It has been recognized by the present applicants that the text in a video source is often present in a plurality of sequential video frames and the position of the text in these video frames changes little from video frame to video frame. For example, if a user wants to translate a street sign, they would point at the sign and hold the camera so that at least a few video frames are captured, where the position of the sign does not change much. Alternatively, a user might want to translate a page of text or a restaurant menu by moving the camera across the text; in this scenario, again, the same text is usually present in a plurality of video frames while the camera is going over it and the position of the text with the video frames changes relatively slowly. Therefore, it is possible to utilize prior frame data for efficient OCR processing of video frames in video sources.

For example, the prior frame data for OCR processing of video frames in video sources may be used in the following manner. When during OCR-processing of a video frame it is determined that this video frame is not the first in the video source and a preceding or prior video frame or video frames have been already processed, OCR data generated during OCR processing of the prior video frame or video frames may be utilized in OCR processing of the current video frame. In particular, locations of text in the prior video frame or video frames may be used to locate text in the current video frame. Also, if at least a portion of text from a prior video frame or video frames is present in the current video frame, such portions may not need to be subject to OCR processing again, but instead the results of the OCR processing of this text in the prior video frame or video frames may be used.

In one aspect, an example method for OCR processing of a frame in a video source comprises receiving by a hardware processor the frame from the video source; retrieving from a memory prior frame data associated with the video source; and processing by the hardware processor at least a portion of the frame to detect one or more text strings, wherein the OCR processing of the portion of the frame includes at least one of: using the prior frame data to detect in the portion of the frame at least one blob similar to at least one blob described in the prior frame data; using at least one blob similar to at least one blob described in the prior frame data to detect in the portion of the frame at least one character candidate similar to at least one character candidate described in the prior frame data; using at least one character candidate similar to at least one character candidate described in the prior frame data to detect in the portion of the frame at least one text candidate similar to at least one text candidate described in the prior frame data; and using at least one text candidate similar to at least one text candidate described in the prior frame data to detect in the portion of the frame at least one text string similar to at least one text string described in the prior frame data.

In one aspect, an example system for OCR processing of a frame in a video source comprises a computer processor configured to receive the frame from the video source; a memory coupled to the processor and configured to store a prior frame data associated with the video source; and wherein the processor being further configured to execute an OCR engine for detection of one or more text strings in at least a portion of the frame, wherein the OCR engine includes one or more of: a blob detection module configured to use the prior frame data to detect in the portion of the frame at least one blob similar to at least one blob described in the prior frame data; a character candidate detection module configured to use at least one blob similar to at least one blob described in the prior frame data to detect in the portion of the frame at least one character candidate similar to at least one character candidate described in the prior frame data; a text candidate detection module configured to use at least one character candidate similar to at least one character candidate described in the prior frame data to detect in the portion of the frame at least one text candidate similar to at least one text candidate described in the prior frame data; a text string detection module configured to use at least one text candidate similar to at least one text candidate described in the prior frame data to detect in the portion of the frame at least one text string similar to at least one text string described in the prior frame data.

In one aspect, an example computer program product stored on a non-transitory computer-readable storage medium comprises computer-executable instructions for OCR processing of a frame in a video source, including instructions for: receiving by a hardware processor the frame from the video source; retrieving from a memory prior frame data associated with the video source; and performing by the hardware processor processing of at least a portion of the frame to detect one or more text strings, wherein the OCR processing of the portion of the frame includes at least one of: using the prior frame data to detect in the portion of the frame at least one blob similar to at least one blob described in the prior frame data; using at least one blob similar to at least one blob described in the prior frame data to detect in the portion of the frame at least one character candidate similar to at least one character candidate described in the prior frame data; using at least one character candidate similar to at least one character candidate described in the prior frame data to detect in the portion of the frame at least one text candidate similar to at least one text candidate described in the prior frame data; and using at least one text candidate similar to at least one text candidate described in the prior frame data to detect in the portion of the frame at least one text string similar to at least one text string described in the prior frame data.

Some aspects further comprise at least one of: translating at least one text string into a different language and converting at least one text string to audio.

In some aspects the similarity includes at least one of similarity in position within a frame, similarity in orientation within a frame, similarity in shape, and similarity in content.

In some aspects the prior frame data contain only data for a smaller portion of the frame encompassed by the portion of the frame.

In some aspects at least one blob description in the prior frame data comprises position of the blob within the frame; orientation of the blob within the frame; and shape of the blob.

In some aspects at least one character candidate description in the prior frame data comprises position of the character candidate within the frame; orientation of the character candidate within the frame; and shape of the character candidate.

In some aspects at least one text candidate description in the prior frame data comprises position of the text candidate within the frame; orientation of the text candidate within the frame; and shape of the text candidate.

In some aspects at least one text string description in the prior frame data comprises position of the text string within the frame; orientation of the text string within the frame; and content of the text string.

In some aspects the hardware processor used for the OCR processing of the portion of the frame and at least one hardware processor used to generate the prior frame data are different processors.

In some aspects the hardware processor used for the OCR processing of the portion of the frame and at least one hardware processor used to generate the prior frame data are different cores of a single multi-core processor.

Some aspects further comprise storing in the memory new frame data comprising at least one of at least one detected blob; at least one detected character candidate; at least one detected text candidate; and at least one detected text string.

In some aspects the OCR processing of the portion of the frame further includes at least one of detecting in the portion of the frame at least one blob not similar to blobs described in the prior frame data; detecting in the portion of the frame at least one character candidate not similar to character candidates described in the prior frame data; detecting in the portion of the frame at least one text candidate not similar to text candidates described in the prior frame data; and detecting in the portion of the frame at least one text string not similar to text strings described in the prior frame data.

In one aspect, an example method for OCR processing of a frame in a video source comprises OCR processing by a hardware processor a first portion of a first frame to generate first frame data, wherein the OCR processing of the first portion of the first frame includes at least one of blob detection in the first portion of the first frame to add at least one blob description to the first frame data, character candidate detection in the first portion of the first frame to add at least one character candidate description to the first frame data, text candidate detection in the first portion of the first frame to add at least one text candidate description to the first frame data, and text string detection in the first portion of the first frame to add at least one text string description to the first frame data; and OCR processing by a hardware processor a second portion of a second frame, subsequent in time to the first frame, wherein the OCR processing of the second portion of the second frame includes at least one of: blob detection in the second portion of the second frame using the first frame data to detect at least one blob similar to the at least one blob detected in the first frame, character candidate detection in the second portion of the second frame using the first frame data to detect at least one character candidate similar to the at least one character candidate detected in the first frame, text candidate detection in the second portion of the second frame using the first frame data to detect at least one text candidate similar to the at least one text candidate detected in the first frame, and text string detection in the second portion of the second frame using the first frame data to detect at least one text string similar to the at least one text string detected in the first frame; wherein the similarity includes at least one of: similarity in position within a frame, similarity in orientation within a frame, similarity in shape, and similarity in content.

In some aspects outlines of the second portion of the second frame encompass outlines of the first portion of the first frame.

In some aspects the at least one blob description comprises position of the blob within the first frame; orientation of the blob within the first frame; and shape of the blob.

In some aspects the at least one character candidate description comprises position of the character candidate within the first frame; orientation of the character candidate within the first frame; and shape of the character candidate.

In some aspects the at least one text candidate description comprises position of the text candidate within the first frame; orientation of the text candidate within the first frame; and shape of the text candidate.

In some aspects the at least one text string description comprises position of the text string within the first frame; orientation of the text string within the first frame; and content of the text string.

In some aspects the hardware processor used for the OCR processing of the first portion of the first frame and the hardware processor used for the OCR processing of the second portion of the second frame are different processors.

In some aspects the hardware processor used for the OCR processing of the first portion of the first frame and the hardware processor used for the OCR processing of the second portion of the second frame are different cores of a single multi-core processor.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for OCR processing of video frames in video sources. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
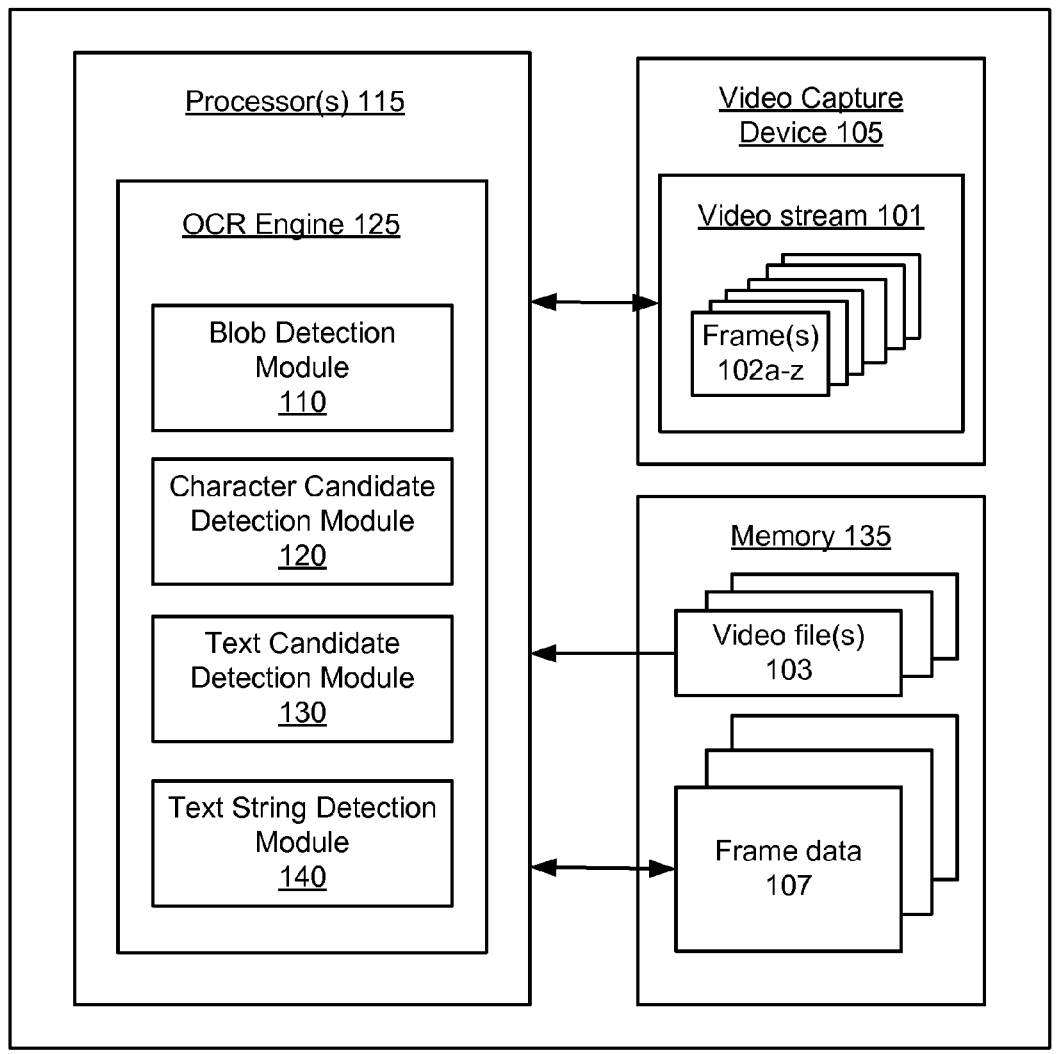
FIG. 1A illustrates a block diagram of an example system for using prior frame data for OCR processing of video frames in video sources according to one aspect.
Figure 1B:
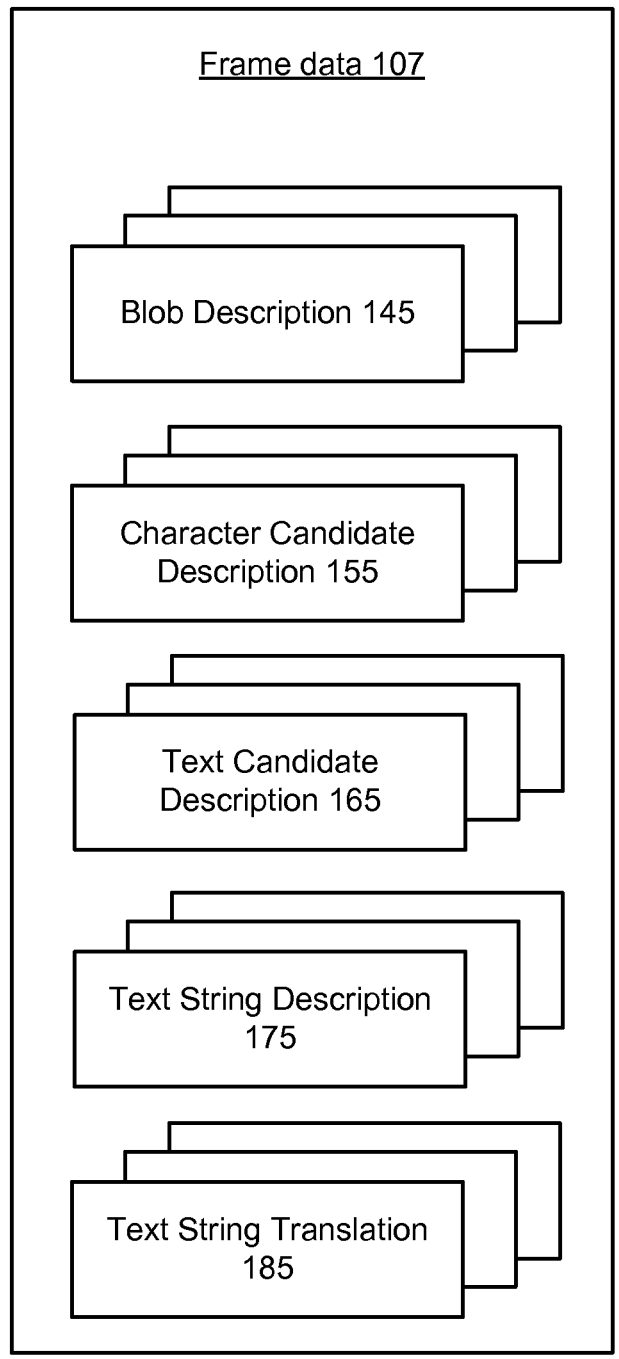
FIG. 1B illustrates a block diagram of an example data structure for storing video frame data for OCR processing of video frames in video sources according to one aspect.

FIGS. 1A and 1B show an example system 100 for using prior frame data for OCR processing of video frames in video sources according to one aspect of the present invention. The system 100 may be implemented on a user device, such as a mobile phone, a table computer, a personal computer, a digital video camera or other type of data processing device. In one example aspect shown in FIG. 1A, the system 100 may include a video capture device 105, such as digital video camera. The video capture device 105 may include at least video optics including a lens through which video may be captured, and an image sensor coupled to the camera optics for capturing digital images. The video capture device 105 sends a stream 101 of uncompressed raw digital images (i.e., video frames 102a-z) to a processor 115 for OCR processing. Alternatively, digital video may be stored in a memory 135 (e.g., RAM or Flash memory) of system 100 as a compressed video file 103, such as Flash, AVI, QuickTime, MPEG-4, Windows Media Video or other video compression format. These are examples of video sources consisting of a temporal sequence of video frames.

In one example aspect, the system 100 may use a single processor 115 (e.g., a computer CPU, an image processor, a digital signal processor, a graphics processor, etc.) or a dedicated application specific integrated circuit (ASIC) for OCR processing of video sources 101 or files 103. In another example aspect, the system 100 may use several processors 115 running in parallel or a single multi-core processor 115 (e.g., Intel Core Duo®) for the OCR processing of a video source. For example, as will be described in greater detail herein below, the OCR processing of video frames of a video source may be distributed between several processors 115 running in parallel or between different cores of a single multi-core processor 115.

Regardless of its specific implementation, the processor 115 is configured to execute an Optical Character Recognition (OCR) engine 125. OCR engine 125 receives video frames from a video source, such as a raw video stream 101 generated by the video capture device 105 or a compressed video file 103 stored in the memory 135, and performs OCR processing of the text contained in the received video frames. The processing may include blob detection, blob description recording, character candidate detection, character candidate description recording, text candidate detection, text candidate description recording, text string detection, text string description steps and the like. The steps will be described in detail below. OCR engine 125 may be implemented as a software, such as a standalone desktop application software or a mobile app, as a web app executable within a Web browser, or as a background process (or program) executed by a video capture or video playback software of the user device. In one example aspect, the OCR engine 125 may include a plurality of functional modules, including but not limited to: a blob detection module 110, a character candidate detection module 120, a text candidate detection module 130, and a text string detection module 140. In one aspect, all functional modules of the OCR engine 125 may be executed completely by the processor 115 of the user device. In another aspect, some of the modules may be executed by the processor 115 while other modules may be executed on a remote network server. For example, the OCR engine 125 may optionally include a translation module, which may perform translation of detected text (text strings) into various languages. Since translation of text is generally a very resource intensive process, it may be performed by a remote network server to save computing resources of system 100.

In one example aspect, the memory 135 stores frame data 107 accumulated in the course of processing of video frames associated with a single video source (e.g., video stream 101 or video file 103). As shown in FIG. 1B, the frame data 107 may include, but not limited to: blob descriptions 145 for each processed video frame or for a group of adjacent frames, character candidate descriptions 155 for one or more blobs in each processed video frame or for a group of adjacent frames, text candidate descriptions 165 for one or more character candidates in each processed video frame or for a group of adjacent frames, text string descriptions 175 for one or more text candidates in each processed video frame or for a group of adjacent frames, and optional text string translations 185 for one or more text strings in each processed video frame or for a group of adjacent frames.

In one example aspect, the blob detection module 110 may be configured to perform blob detection in received video frames. Blob detection refers to mathematical methods that are aimed at detecting regions in a digital image that differ in properties, such as brightness or color, compared to areas surrounding those regions. A blob is a region of a digital image in which some properties are constant or vary within a prescribed range of values; all the points in a blob can be considered in some sense to be similar to each other. Given some property of interest expressed as a function of position on the digital image, there are generally two main classes of blob detectors: (i) differential methods, which are based on derivatives of the function with respect to position, and (ii) methods based on local extrema, which are based on finding the local maxima and minima of the function In one example aspect, the blob detection may be performed for an entire video frame 102 or for only a portion of the video frame. For example, the portion of the video frame that is nearest the center of an image may be processed first for blob detection. Then, as subsequent video frames are captured, the portion of the image, where blobs are being detected and further steps of OCR processing are run, is expanded so that the text at the center of the image, which is likely of greater interest to the user, is recognized earlier than the text at the periphery of the image.

The blob detection module 110 may use, for example, algorithms provided by IJBiob, a library for connected component analysis and shape analysis, described in Wagner, T and Lipinksi, H 2013 IJBiob: An ImageJ Library for Connected Component Analysis and Shape Analysis. Journal of Open Research Software 1:e6, DOI. A common approach to detecting blobs is binarization, wherein a grayscale or a color image is transformed into a black-and-white image based on whether the image value at each pixel is greater than a certain threshold value. Another method of detecting blobs known in the art is MSER, which stands for Maximally Stable Extremal Regions.

Once a blob is detected, its features and parameters, or any subset of its features and parameters, such as blob's position within the video frame, blob's shape, blob's orientation, number of holes, center of gravity, enclosed area, area convex hull, perimeter, perimeter of the convex hull, circularity, thinness ratio, Feret diameter, minimal Feret diameter, long side minimum bounding rectangle, short side minimum bounding rectangle, aspect ratio, area/perimeter ratio, inertia tensor aspect ratio, number of horizontal RLE (run length encoding) strokes, number of vertical RLE strokes, module of a difference of mean gray values inside and outside the blob's region, variance of gray levels inside the region, variance of gray levels outside the region, HOG (histogram of oriented gradients), temperature of the outer contour, fractal box dimension, region based moments, central region based moments, eigenvalue major axis, eigenvalue minor axis, elongation, convexity, solidity, orientation, and outer contour as freeman-chain-code, may be recorded or stored in the system memory 135, thus forming a blob description 145. A blob description 145 may be stored for every detected blob; such descriptions are being added to the frame data 107 for the video frame where the blobs are detected.

Once some blobs are detected, in an example aspect, the character candidate detection module 120 detects the blobs that can correspond to natural language characters (i.e. character candidates) and the blobs that cannot correspond to characters (or at least unlikely to represent characters), for example, by using such algorithms as AdaBoost classifier and/or SVM (support vector machine) and/or a random forest. It should be noted that different character detection algorithms may be used to detect characters in different languages (e.g., English, Russian, Chinese, Arabic, etc.).

Once character candidates are detected among blobs in a video frame, the corresponding blob descriptions 145 may be designated in the system memory 135 for further OCR processing and/or the remaining blobs descriptions 145 may be designated in the system memory 135 as excluded from further OCR processing; furthermore, the additional data obtained for each blob by running the character candidate detection algorithms may be added to the corresponding blob descriptions 145 and to the frame data 107 recorded or stored in the system memory 135. These designations and the additional data may form character candidate descriptions 155 for each character candidate added to the frame data 107 for the video frame where the blobs are detected.

In one example aspect, when blob detection is performed on a video frame 102b, the blob descriptions 145 obtained by blob detection in a prior video frame 102a (such as position of blobs within the video frame, their shape, and orientation of blobs, etc., as described hereinabove) may be used to detect identical or similar blobs in the current video frame 102b. The prior video frame may be the video frame immediately preceding the current video frame in time or any previous video frame. For example, if all blobs found in the prior video frame 102a are located within a specific region of that video frame, at least initially the blob detection may be run only for the same region in the current video frame 102b. In one aspect, data about the frame's movement with respect to the captured scene, obtained using, for example, one of motion estimation algorithms, may be used to detect an estimated position of the considered region of the current frame in the prior frame. If a blob is found in the current video frame 102b that is sufficiently similar in position, shape, orientation, and/or its other features and parameters to a blob in the prior video frame 102a, these two blobs in different video frames may be recognized as representing the same object seen by the video capture device 105, for example, as the same letter on a surface. In such cases, some of the subsequent processing of the blob in the current video frame to obtain some data related to this blob may not be necessary, because the data obtained and stored for the blob in the prior video frame may be used instead. For example, if a blob in a prior video frame had been determined to be a character candidate, the similar blob in the current video frame may be designated as a character candidate without having to run character candidate detection algorithms.

Once some character candidates are detected in a video frame, in an example aspect, the text candidate detection module 130 may be used to group at least some of the character candidates into clusters corresponding to blocks of texts, such as words, sentences, paragraphs, etc. for example, by using a minimum spanning tree algorithm and/or a single-link clustering algorithm. These detected clusters of character candidates represent detected text candidates.

Once a text candidate is detected, its features and its parameters, or any subset of its features and parameters, such as its position within the video frame, its shape, its orientation, the character candidates forming the text candidate, may be recorded or stored in the system memory 135, to form a text candidate description 165. A text candidate description 165 may be stored for every detected text candidate; such descriptions are being added to the frame data 107 for the video frame where the text candidates are detected.

Once some text candidates are detected, in an example aspect, the text detection module 140 runs algorithms for detecting text in the text candidates. These algorithms take a text candidate (i.e. a cluster of selected blobs) on their input and return a text string that this cluster of blobs represents (recognition result) together with the information data about how this string is positioned, such as its size, length, and width, its orientation, its bounding rectangle, etc.

When text candidate detection is performed on a video frame, the text candidates obtained for a prior video frame (such as position of clusters of character candidates within the video frame, their shape, and orientation of character candidates, etc., as disclosed hereinabove) may be used to detect text candidates in the current video frame. For example, if all text candidates found in the prior video frame 102a are located within a specific region in the video frame, at least initially the text candidate detection may be run only for character candidates in that region in the current video frame 102b. If a detected cluster of character candidates (i.e., a text candidate) in the current video frame is similar in position, shape, orientation, and other features and parameters to a detected cluster of character candidates (i.e., a text candidate) in a prior video frame, these two text candidates in different video frames may be recognized as representing the same object, for example, the same word or group of words on a surface, as in the text candidate in the prior video frame. In such cases, some of the subsequent processing of the text candidate in the current video frame to obtain some data related to this text candidate may not be necessary, because the data obtained and stored for the text candidate in the prior video frame may be used instead. For example, if a text candidate in a prior video frame had been determined to represent a string of text, and if a similar text candidate is present in the current video frame, then a text string description based on the text string description for the text candidate from the prior video frame may be added to the current video frame data without having to run text string detection algorithms.

Once a text string is detected, its parameters, such as its position within the video frame, its size, length, and width, its orientation, and its content are recorded or stored in the system memory 115, to form a text string description 175. A text string description 175 may be stored for every detected text string; such descriptions are being added to the frame data 107 for the video frame where the text candidates are detected. In one example aspect, the text string description may be used to translate the detected text into another language in real time and replace the text in the frame with its translation in another language. In this case, the translation of the text string 185 may be also saved in the frame date 107 and used to replace similar text in subsequent frames without the need to perform text translation for every subsequent frame again.

In one example aspect, the OCR processing of video frames of a video source may be distributed between several processors 115 running in parallel or between different cores of a single multi-core processor 115. Each subsequent video frame processed by the system 100 may be processed by any of the modules 110, 120, 130, and 140 running on the same processor 115 or on a processor that is different from the processor used for the prior video frame or on a different processor core of processor 115 running in parallel for greater efficiency. For example while one processor 115 or processor core of processor 115 processes first video frame, a second video frame is captured and sent for processing to a second processor or another processor core of the processor 115; the first frame data are accumulated in memory and used for processing the second video frame.

Figure 2:
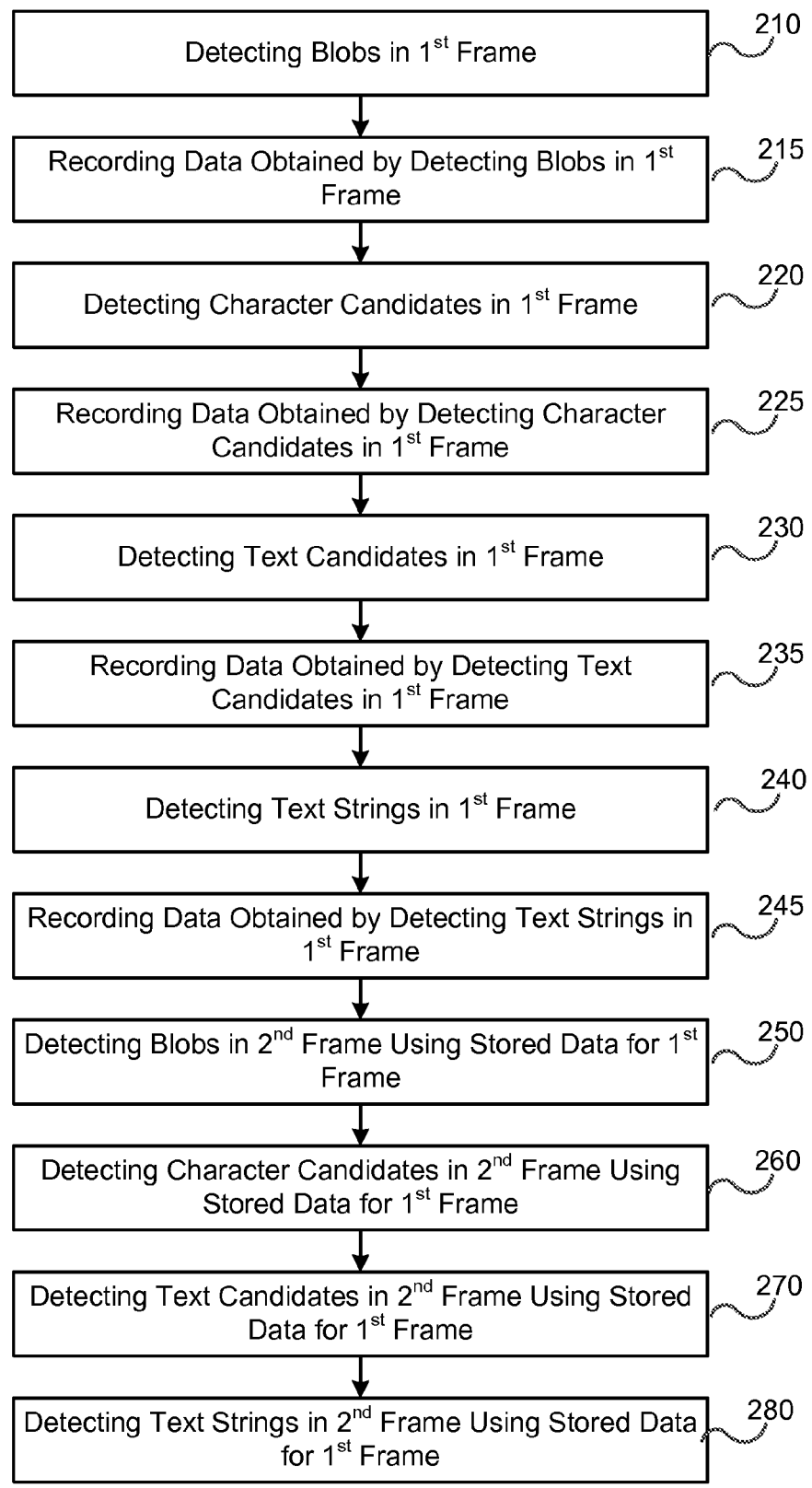
FIG. 2 illustrates a flow diagram of an example method for using prior frame data for OCR processing of video frames in video sources according to one aspect.

FIG. 2 illustrates an example method for using prior frame data for OCR processing of video frames in video sources according to one aspect. In one example aspect, at step 210, the blob detection may be performed to detect blobs in the first video frame upon its capture. The blob detection may be performed for the entire first video frame or for only a portion of the first video frame. For example, the portion of the first video frame that is nearest the center of an image may be processed at step 210 for blob detection.

Once a blob is detected, at step 215, its features and parameters, or any subset of its features and parameters, such as blob's position within the first video frame, blob's shape, blob's orientation, number of holes, center of gravity, enclosed area, area convex hull, perimeter, perimeter of the convex hull, circularity, thinness ratio, Feret diameter, minimal Feret diameter, long side minimum bounding rectangle, short side minimum bounding rectangle, aspect ratio, area/perimeter ratio, inertia tensor aspect ratio, number of horizontal RLE strokes, number of vertical RLE strokes, module of a difference of mean gray values inside and outside the blob's region, variance of gray levels inside the region, variance of gray levels outside the region, HOG, temperature of the outer contour, fractal box dimension, region based moments, central region based moments, eigenvalue major axis, eigenvalue minor axis, elongation, convexity, solidity, orientation, and outer contour as freeman-chaincode, may be recorded or stored in the system's memory 135, thus forming a blob description. A blob description may be stored for every detected blob; in this process such descriptions are being added to the first frame data.

Once some blobs are detected in the first video frame, in an example aspect, the blobs that can correspond to characters (i.e. character candidates) and the blobs that cannot correspond to characters (or at least unlikely to represent characters) are detected at step 220, for example, by using such algorithms as AdaBoost classifier and/or SVM (support vector machine) and/or a random forest.

At step 225, once character candidates are detected among blobs in the first video frame, the corresponding blob descriptions may be designated in the system memory 135 for further OCR processing and/or the remaining blobs descriptions may be designated in the system's memory 135 as excluded from further OCR processing; furthermore, the additional data obtained for each blob by running the character candidate detection algorithms may be added to the first frame data recorded or stored in the system's memory 135. These designations and the additional data may form character candidate descriptions for each character candidate added to the first frame data.

Once some character candidates are detected in the first video frame, in an example aspect, at step 230 at least some of the character candidates are grouped into clusters corresponding to blocks of texts, such as words, for example, by using a minimum spanning tree algorithm and/or a single-link clustering algorithm. These detected clusters of character candidates represent detected text candidates in the first video frame.

Once a text candidate is detected in the first video frame, its features and its parameters, or any subset of its features and parameters, such as its position within the first video frame, its shape, its orientation, the character candidates forming the text candidate, may be recorded or stored in the system's memory 135, to form a text candidate description at step 235. A text candidate description may be stored for every detected text candidate in the first video frame; such descriptions are being added to the first frame data.

Once some text candidates are detected in the first video frame, in an example aspect, at step 240 algorithms are used for detecting text strings in the text candidates.

Once a text is detected, its parameters, such as its position within the first video frame, its size, length, and width, its orientation, and its content are recorded or stored at step 245 in the system's memory 135, to form a text string description. A text string description may be stored for every detected text string in the first video frame; such descriptions are being added to the first frame data.

After the first video frame is captured by the image sensor coupled to the camera optics for capturing images, a second video frame is captured by the image sensor coupled to the camera optics for capturing images.

The blob detection for the second video frame at step 250 may use the same algorithm or algorithms as for the first video frame at step 210. A blob description may be stored for every detected blob in the second video frame; in this process such descriptions are being added to the second frame data.

The blob detection at step 250 may be performed for the entire second video frame or for only a portion of the second video frame. The portion of the second video frame where blobs are being detected and further steps of processing are run, may be expanded in comparison with such portion in the first video frame, so that, for example, the text at the center of the image, which is likely of greater interest to the user, is recognized earlier than the text at the periphery of the image.

When blob detection is performed on the second video frame at step 250, the blob descriptions obtained by blob detection in the first video frame (such as position of blobs within the video frame, their shape, and orientation of blobs, etc., as described hereinabove) may be used to detect blobs in the second video frame. For example, if all blobs found in the first video frame are located within a specific region in the first video frame, at least initially the blob detection for the second video frame at step 250 may be run only for that region in the second video frame.

Once some blobs are detected in the second video frame, in an example aspect, the blobs that can correspond to characters (i.e. character candidates) and the blobs that cannot correspond to characters (or at least unlikely to represent characters) may be detected for the second video frame at step 260 using the same algorithm or algorithms as for the first video frame at step 220. The character candidate descriptions for each character candidate may be added to the second frame data at step 260.

If a blob is found in the second video frame that is sufficiently similar in position, shape, orientation, and/or its other features and parameters to a blob in the first video frame, these two blobs in different video frames may be recognized as representing the same object seen by the camera, for example, as the same letter on a surface. In such cases, some of the subsequent processing of the blob in the second video frame to obtain some data related to this blob may not be necessary, because the data obtained and stored for the blob in the first video frame may be used instead. For example, if a blob in the first video frame had been determined to be a character candidate, the similar blob in the second video frame may be designated as a character candidate without having to run character candidate detection algorithms.

Once some character candidates are detected in the second video frame, in an example aspect, at step 270 at least some of the character candidates are grouped into clusters corresponding to blocks of texts, such as words, using the same algorithm or algorithms as for the first video frame at step 230. These detected clusters of character candidates represent detected text candidates in the second video frame. A text candidate description may be stored for every detected text candidate in the second video frame; such descriptions are being added to the second frame data at step 270.

Once some text candidates are detected in the second video frame, in an example aspect, at step 280 the same algorithms are used for detecting text strings in the text candidates in the second video frame, as were used for detecting text strings in the text candidates in the first video frame. A text string description may be stored for every detected text string in the second video frame; such descriptions are being added to the second frame data at step 280.

When text candidate detection is performed on the second video frame, the text candidates obtained for the first video frame (such as position of clusters of character candidates within the video frame, their shape, and orientation of character candidates, etc., as disclosed hereinabove) may be used to detect text candidates in the second video frame. For example, if all text candidates found in the first video frame are located within a specific region in the first video frame, at least initially the text candidate detection for the second video frame at step 250 may be run only for character candidates in that region in the second video frame. For example, a detected cluster of character candidates (i.e., a text candidate) in the second video frame that is similar in position, shape, orientation, and other features and parameters to a detected cluster of character candidates (i.e., a text candidate) in the first video frame may be recognized as representing the same object, for example, the same word or group of words on a surface, as in the text candidate in the second video frame. In such cases, some of the subsequent processing of the text candidate in the second video frame to obtain some data related to this text candidate may not be necessary, because the data obtained and stored for the text candidate in the first video frame may be used instead. For example, if a text candidate in the first video frame had been determined to represent a string of text, and if a similar text candidate is present in the second video frame, then a text string description based on the text string description for the text candidate from the first video frame may be added to the second frame data without having to run text string detection algorithms.

Each video frame processed as shown in FIG. 2 may be processed on the same processor or on a different processor or a different processor core in parallel for greater efficiency. For example while one processor or processor core processes first video frame, a second video frame is captured for a second processor or processor core to process; the first frame data are accumulated in memory and used for processing the second video frame.

Figure 3:
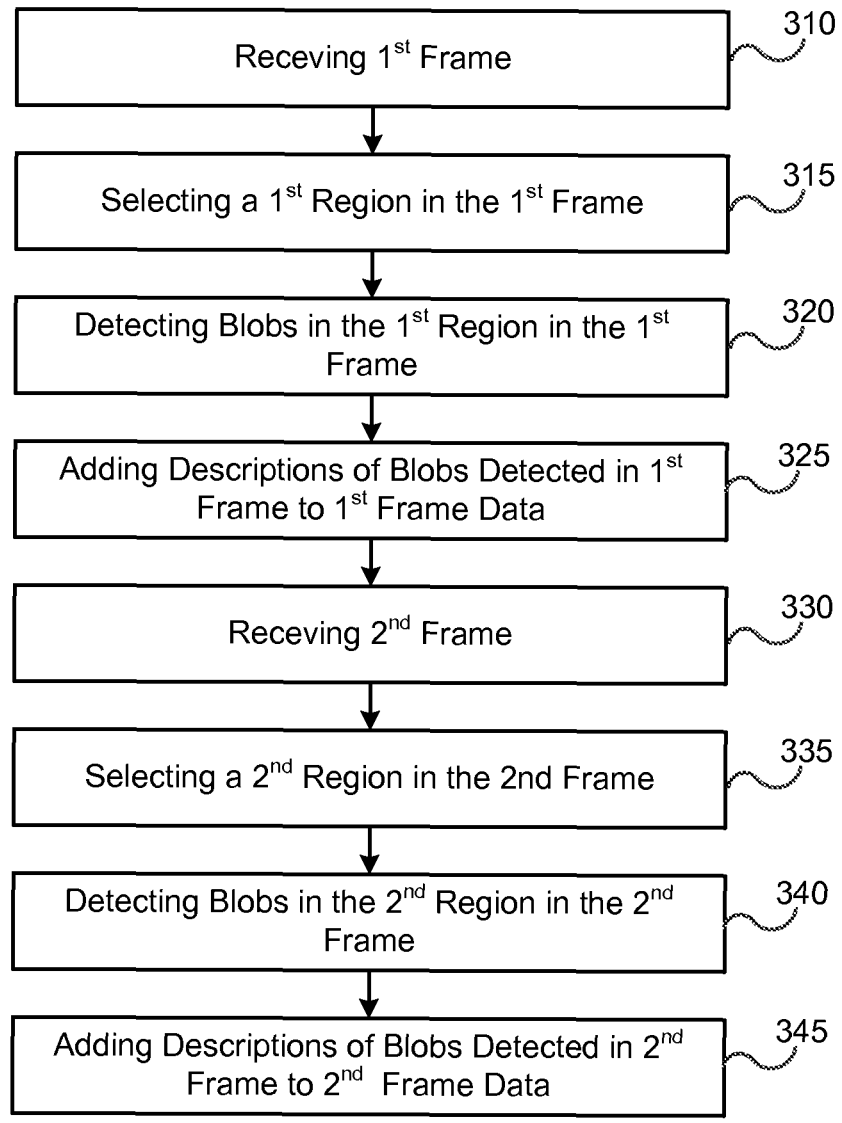
FIG. 3 illustrates a flow diagram of an example method for blob detection according to one aspect.

FIG. 3 illustrates a flow diagram of an example method for blob detection. In an example aspect shown in FIG. 1, this method is executed by the blob detection module 110. At step 310, the first video frame is received. At step 315, a selection is made of a region where blob detection is performed for the first video frame. At step 320, blobs are detected in the first video frame within the selected first region. At step 325, the blob descriptions of blobs detected in the first video frame are added to the first frame data. At step 330, the second video frame is received. At step 335, a selection is made of a second region where blob detection is performed for the second video frame. The second region would typically be larger and contain the first region. At step 340, blobs are detected in the second video frame within the selected second region. At step 345, the blob descriptions of blobs detected in the second video frame are added to the second frame data.

Figure 4:
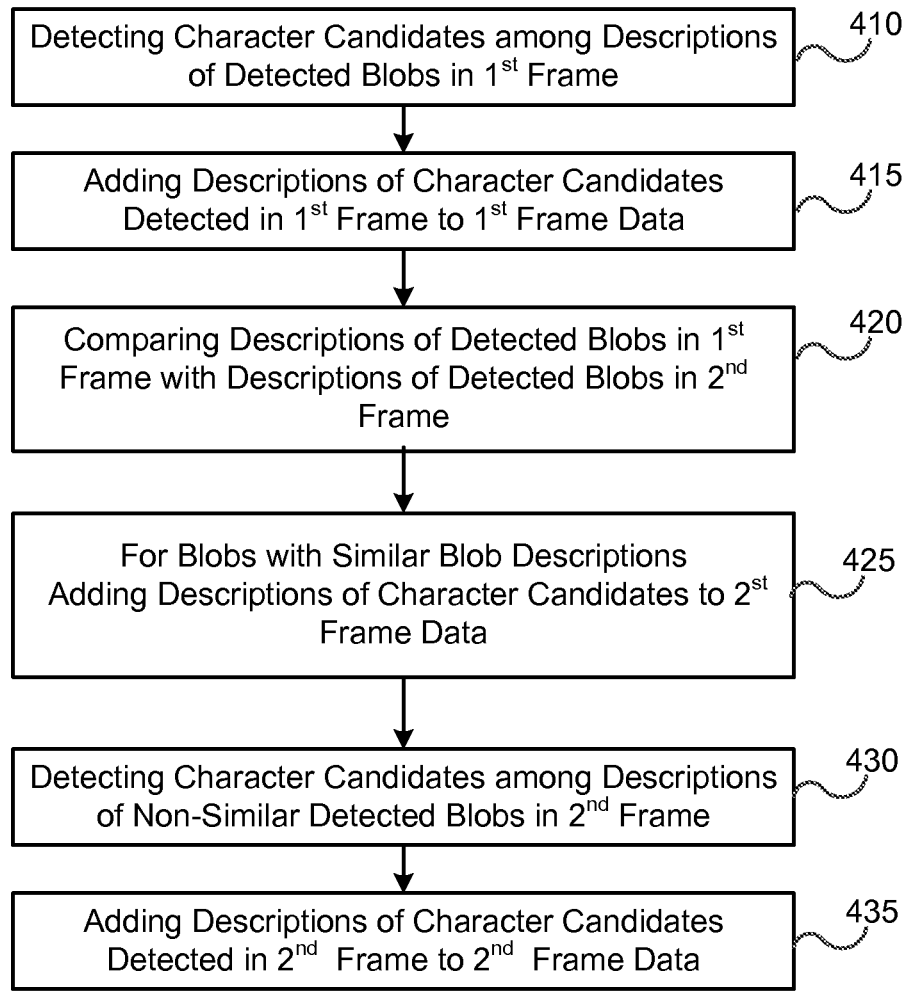
FIG. 4 illustrates a flow diagram of an example method for character candidate detection according to one aspect.

FIG. 4 illustrates a flow diagram of an example method for character candidate detection. In an example aspect shown in FIG. 1, this method is executed by the character candidate detection module 120. At step 410, character candidates are detected among the blob descriptions of blobs detected in the first video frame. At step 415, the descriptions of character candidates detected in the first video frame may be added to the first frame data. Step 415 may involve adding Boolean values to blob description to indicate whether the blob is a character candidate or not. At step 420 the blob descriptions of blobs detected in the first video frame are compared with the blob descriptions of blobs detected in the second video frame to detect blobs in the second video frame that are similar to blobs in the first video frame. If a blob in the first video frame had been determined to be a character candidate, the similar blob in the second video frame may be treated as a character candidate without having to run character candidate detection algorithms. At step 425, descriptions of character candidates for such blobs are added to the second frame data. At step 430, character candidates are detected among the blob descriptions of blobs detected in the second video frame, for which no similar blob descriptions were found in the first frame data. At step 435, the descriptions of character candidates detected in the second video frame at step 430 may be added to the second frame data.

Figure 5:
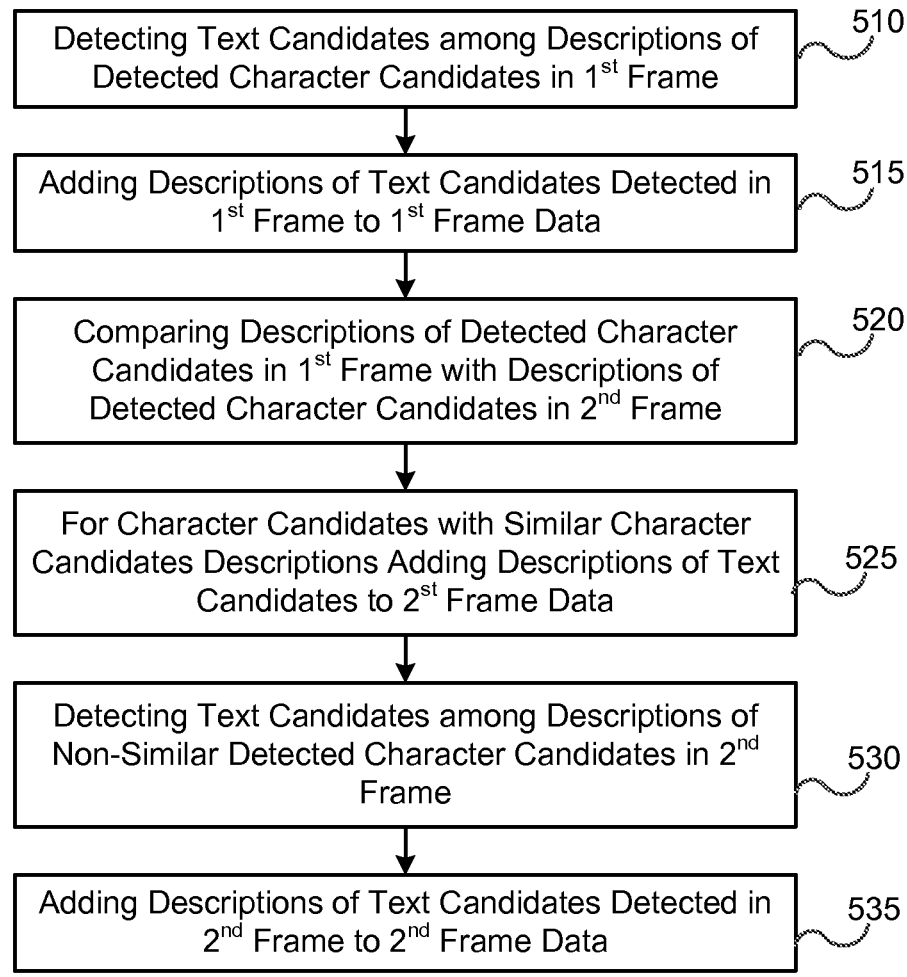
FIG. 5 illustrates a flow diagram of an example method for text candidate detection according to one aspect.

FIG. 5 illustrates a flow diagram of an example method for text candidate detection. In an example aspect shown in FIG. 1, this method is executed by the text candidate detection module 130. At step 510, text candidates are detected among detected character candidates in the first frame data. At step 515, the text candidates descriptions of text candidates detected in the first frame data are added to the first frame data. At step 520 the character candidates descriptions of character candidates detected in the first video frame are compared with the character candidates descriptions of character candidates detected in the second video frame to detect character candidates in the second video frame that are similar to character candidates in the first video frame. If a character candidate (or a group of character candidates) in the first video frame had been determined to be a text candidate, the similar character candidate (or group of character candidates) in the second video frame may be treated as a text candidate without having to run text candidate detection algorithms. At step 525, descriptions of text candidates for such character candidates are added to the second frame data. At step 530, text candidates are detected among the character candidates descriptions of character candidates detected in the second video frame, for which no similar character candidates descriptions were found in the first frame data. At step 535, the descriptions of text candidates detected in the second video frame at step 530 may be added to the second frame data.

Figure 6:
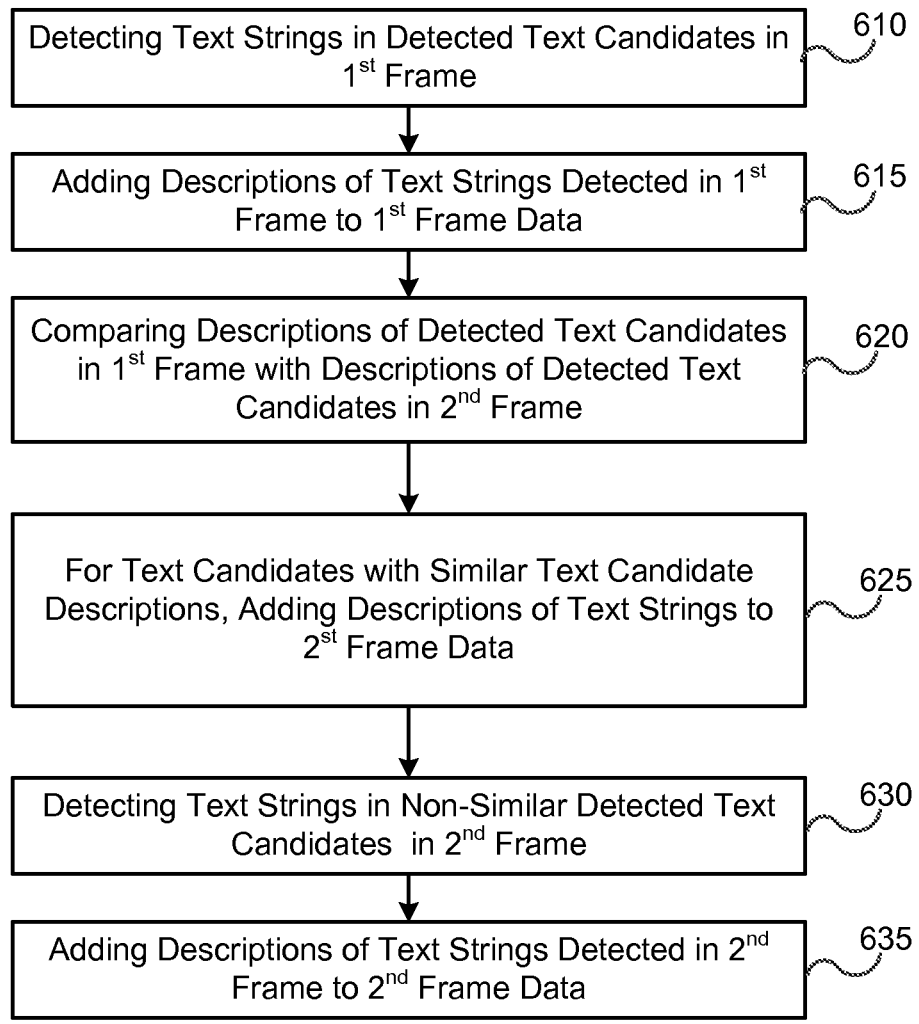
FIG. 6 illustrates a flow diagram of an example method for text string detection according to one aspect.

FIG. 6 illustrates a flow diagram of an example method for text detection. In an example aspect shown in FIG. 1A, this method may be executed by the text detection module 140. At step 610, text strings are detected among the text candidates detected in the first video frame. At step 615, the descriptions of text strings detected in the first video frame may be added to the first frame data. At step 620, the text candidate descriptions of text candidates detected in the first video frame are compared with the text candidate descriptions of text candidates detected in the second video frame to detect text candidates in the second video frame that are similar to text candidates in the first video frame. If a text candidate in the first video frame had been determined to represent a text string, the similar text candidate in the second video frame may be treated as representing the same text string without having to run text detection algorithms. At step 625, text string descriptions of text strings for such text candidates are added to the second frame data. At step 630, text strings are detected for the text candidates detected in the second video frame, for which no similar text candidates were found in the first frame data. At step 635, the descriptions of text strings detected in the second video frame at step 630 may be added to the second frame data.

Figure 7:
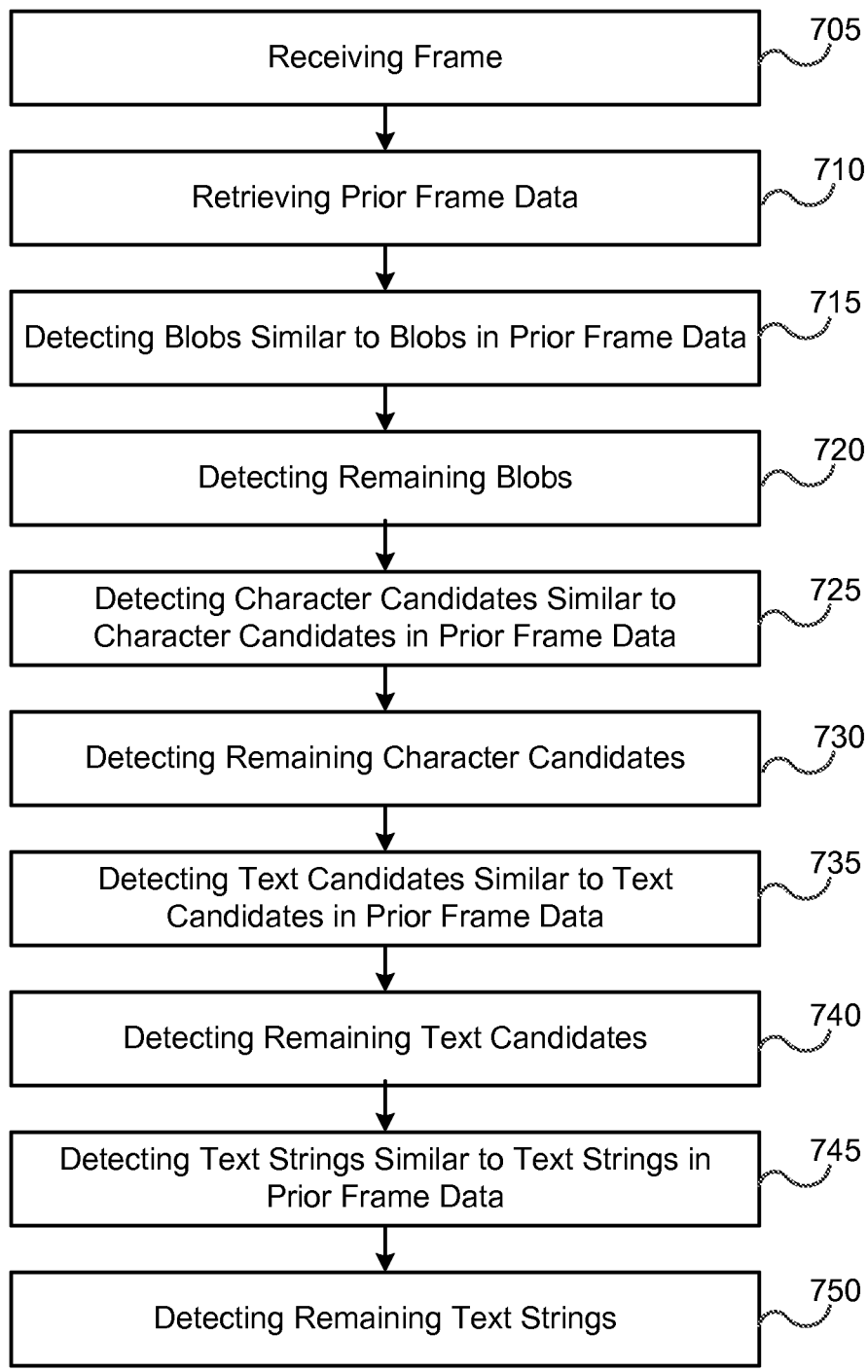
FIG. 7 illustrates a flow diagram of an example method for using prior frame data for OCR processing of video frames in video sources according to one aspect.

FIG. 7 illustrates a flow diagram of an example method for using prior frame data for OCR processing of video frames in video sources according to one aspect. In this aspect, at step 705, a video frame is received from a video stream 101 generated by the video capture device 105 or a video file 103 stored in the memory 135. At step 710, data collected for prior video frame or video frames are retrieved from the memory 135.

At step 715, blobs are detected in the video frame at places where they are expected to be found based on similarity with blobs detected in prior frames and recorded in the prior frame data. At step 720, the remaining blobs, if any, are detected in the video frame. The descriptions of all detected blobs may be stored in the memory 135 to be used for OCR processing of subsequent frames.

At step 725, character candidates are detected in the video frame among the blobs similar to blobs that were checked for being character candidates in the prior frames according to prior frame data. At step 730 the remaining character candidates, if any, are detected in the video frame. The descriptions of all detected character candidates may be stored in the memory 135 to be used for OCR processing of subsequent frames.

At step 735, text candidates are detected in the video frame among the character candidates similar to character candidates that were clustered into text candidates in the prior frames according to prior frame data. At step 740 the remaining text candidates, if any, are detected in the video frame. The descriptions of all detected text candidates may be stored in the memory 135 to be used for OCR processing of subsequent frames.

At step 745, text strings are detected in the video frame among the text candidates similar to text candidates that were detected in the prior frames according to prior frame data. At step 750 the remaining text strings, if any, are detected in the video frame. The descriptions of all detected text strings may be stored in the memory 135 to be used for OCR processing of subsequent frames.

Figure 8:
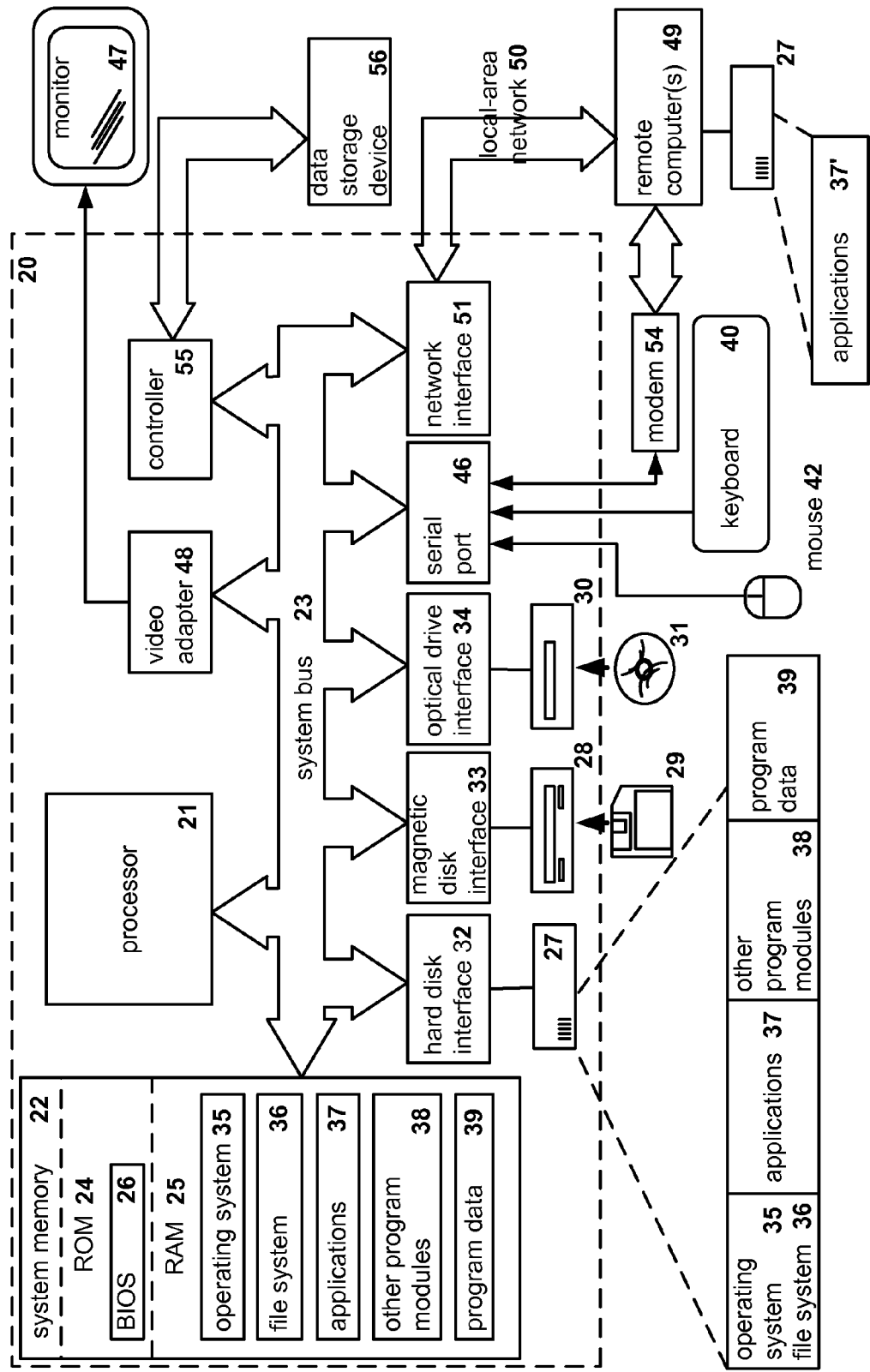
FIG. 8 illustrates an example of a general-purpose computer system, such as a personal computer or server, which may be used to implement the disclosed systems and methods for using prior frame data for OCR the processing of frames in video sources according to one aspect.

FIG. 8 shows an example of a general-purpose computer system (which may be a personal computer or a server) 20, which may be used to implement systems and methods for using prior video frame data for OCR processing of video frames in video sources. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 1A above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for OCR-processing of a current frame in a video source, the method comprising:
   receiving, by a hardware processor, the current frame from the video source;
   retrieving, from a memory, prior frame data of a prior frame associated with the video source;
   detecting, by the hardware processor in at least a portion of the current frame, at least one current frame blob similar to at least one prior frame blob identified in the prior frame data;
   designating, by the hardware processor, the at least one current frame blob as at least one current character candidate without performing character candidate detection operations; and
   identifying, in the at least a portion of the current frame, at least one current text string using the at least one current frame blob.

2. The method of claim 1, further comprising at least one of:
   translating the at least one current text string into another language; or
   converting the at least one current text string to audio.

3. The method of claim 1, wherein the at least one current frame blob is similar to the at least one prior frame blob based on at least one of:
   similarity in position within a respective frame,
   similarity in orientation within a respective frame,
   similarity in shape, or
   similarity in content.

4. The method of claim 1, wherein identifying, in the at least a portion of the current frame, at least one current text string using the at least one current frame blob, comprises:
   grouping the at least one current frame blob designated as the at least one current character candidate and one or more other current character candidates into at least one current cluster of character candidates;
   determining whether the at least one current cluster of character candidates is similar to at least one prior cluster of character candidates identified in the prior frame data;
   in response to determining that the at least one current cluster of character candidates is similar to the at least one prior cluster of character candidates identified in the prior frame data, designating the at least one current cluster of character candidates as at least one current text candidate, without performing text candidate detection operations;
   determining whether current text candidates comprising the at least one current cluster of character candidates designated as the at least one current text candidate are similar to prior text candidates identified in the prior frame data;
   in response to determining that the current text candidates comprising the at least one current cluster of character candidates designated as the at least one current text candidate are similar to the prior text candidates identified in the prior frame data, designating the current text candidates as at least one current text string candidate, without performing text string candidate detection operations; and
   determining that the current text candidates designated as the at least one current text string candidate is similar to at least one prior text string candidate identified in the prior frame data.

5. The method of claim 1, wherein the detecting of the at least one current frame blob similar to the at least one prior frame blob identified in the prior frame data is based on at least one blob description in the prior frame data that comprises:
   position of the at least one prior frame blob within the prior frame;
   orientation of the at least one prior frame blob within the prior frame; and
   shape of the at least one prior frame blob.

6. The method of claim 4, wherein determining that the at least one current cluster of character candidates is similar to the at least one prior cluster of character candidates identified in the prior frame data is based on at least one character candidate description in the prior frame data that comprises:
   position of the at least one prior cluster of character candidates within the prior frame;
   orientation of the at least one prior cluster of character candidates within the prior frame; and
   shape of the at least one prior cluster of character candidates.

7. The method of claim 4, wherein determining that the current text candidates comprising the at least one current cluster of character candidates designated as the at least one current text candidate are similar to the prior text candidates identified in the prior frame data is based on at least one text candidate description in the prior frame data that comprises:
   position of the prior text candidates within the prior frame;
   orientation of the prior text candidates within the prior frame; and
   shape of the prior text candidates.

8. The method of claim 4, wherein determining that the current text candidates designated as the at least one current text string candidate is similar to the at least one prior text string candidate identified in the prior frame data is based on at least one text string description in the prior frame data that comprises:
   position of the at least one prior text string within the prior frame;
   orientation of the at least one prior text string within the prior frame; and
   content of the at least one prior text string.

9. The method of claim 1, wherein the hardware processor used for OCR-processing of the at least a portion of the current frame and at least one hardware processor used to generate the prior frame data are different processors.

10. The method of claim 1, wherein the hardware processor used for OCR-processing of the at least a portion of the current frame and at least one hardware processor used to generate the prior frame data are different cores of a single multi-core processor.

11. The method of claim 4 further comprising storing in the memory new frame data comprising at least one of:
    the at least one current frame blob;
    the at least one current character candidate;
    the at least one current text candidate; or
    the at least one current text string.

12. The method of claim 4, further comprising at least one of:
    detecting in the at least a portion of the current frame at least one blob not similar to blobs described in the prior frame data;
    detecting in the at least a portion of the current frame at least one character candidate not similar to character candidates described in the prior frame data;
    detecting in the at least a portion of the current frame at least one text candidate not similar to text candidates described in the prior frame data; or detecting in the at least a portion of the current frame at least one text string not similar to text strings described in the prior frame data.

13. A system for OCR-processing of a current frame in a video source, the system comprising:
a computer processor configured to receive the current frame from the video source; and
a memory coupled to the processor configured to:
store a prior frame data of a prior frame associated with the video source; detect, in at least a portion of the current frame, at least one current frame blob similar to at least one prior frame blob identified in the prior frame data;
designate at least one current frame blob as at least one current character candidate without performing character candidate detection operations; and
identify, in the at least a portion of the current frame, at least one current text string using the at least one current frame blob.

14. The system of claim 13, wherein the processor is further configured to perform at least one of:
translating the at least one current text string into another language; or
converting the at least one current text string to audio.

15. The system of claim 13, wherein the at least one current frame blob is similar to the at least one prior frame blob based on at least one of:
similarity in position within a respective frame,
similarity in orientation within a respective frame,
similarity in shape, or
similarity in content.

16. The system of claim 13, wherein to identify, in the at least a portion of the current frame, at least one current text string using the at least one current frame blob, the processor is to:
group the at least one current frame blob designated as the at least one current character candidate and one or more other current character candidates into at least one current cluster of character candidates;
determine whether the at least one current cluster of character candidates is similar to at least one prior cluster of character candidates identified in the prior frame data;
in response to determining that the at least one current cluster of character candidates is similar to the at least one prior cluster of character candidates identified in the prior frame data, designate the at least one current cluster of character candidates as at least one current text candidate, without performing text candidate detection operations;
determine whether current text candidates comprising the at least one current cluster of character candidates designated as the at least one current text candidate are similar to prior text candidates identified in the prior frame data;
in response to determining that the current text candidates comprising the at least one current cluster of character candidates designated as the at least one current text candidate are similar to the prior text candidates identified in the prior frame data, designate the current text candidates as at least one current text string candidate, without performing text string candidate detection operations; and
determine that the current text candidates designated as the at least one current text string candidate is similar to at least one prior text string candidate identified in the prior frame data.

17. The system of claim 13, wherein at least one blob description in the prior frame data comprises:
position of the blob within the prior frame;
orientation of the blob within the prior frame; and
shape of the blob.

18. The system of claim 16, wherein the processor is to detect the at least one current frame blob similar to the at least one prior frame blob identified in the prior frame data based on at least one blob description in the prior frame data that comprises:
position of the at least one prior frame blob within the prior frame;
orientation of the at least one prior frame blob within the prior frame; and
shape of the at least one prior frame blob.

19. The system of claim 16, wherein the processor is to determine that the at least one current cluster of character candidates is similar to the at least one prior cluster of character candidates identified in the prior frame data based on at least one character candidate description in the prior frame data that comprises:
position of the at least one prior cluster of character candidates within the prior frame;
orientation of the at least one prior cluster of character candidates within the prior frame; and
shape of the at least one prior cluster of character candidates.

20. The system of claim 16, wherein the processor is to determine that the current text candidates comprising the at least one current cluster of character candidates designated as the at least one current text candidate are similar to the prior text candidates identified in the prior frame data based on at least one text candidate description in the prior frame data that comprises:
position of the prior text candidates within the prior frame;
orientation of the prior text candidates within the prior frame; and
shape of the prior text candidates.

21. The system of claim 13, wherein the hardware processor used for OCR-processing of the at least a portion of the current frame and at least one hardware processor used to generate the prior frame data are different processors.

22. The system of claim 13, wherein the hardware processor used for OCR-processing of the at least a portion of the current frame and at least one hardware processor used to generate the prior frame data are different cores of a single multi-core processor.

23. The system of claim 16, wherein the processor is further configured to store in the memory new frame data comprising at least one of:
the at least one current frame blob;
the at least one current character candidate;
the at least one current text candidate; or
the at least one current text string.

24. The system of claim 13 wherein the processor is further configured to perform at least one of:
detecting in the at least a portion of the current frame at least one blob not similar to blobs described in the prior frame data;
detecting in the at least a portion of the current frame at least one character candidate not similar to character candidates described in the prior frame data;
detecting in the at least a portion of the current frame at least one text candidate not similar to text candidates described in the prior frame data; or detecting in the at least a portion of the current frame at least one text string not similar to text strings described in the prior frame data.

25. A non-transitory computer-readable storage medium, comprising computer-executable instructions, which when executed by a processor cause the processor to perform operations comprising:
receiving the current frame from a video source;
retrieving, from a memory, prior frame data of a prior frame associated with the video source;
detecting, by the processor in at least a portion of the current frame, at least one current frame blob similar to at least one prior frame blob identified in the prior frame data;
designating, by the processor, the at least one current frame blob as at least one current character candidate without performing character candidate detection operations; and
identifying, in the at least a portion of the current frame, at least one current text string using the at least one current frame blob.

26. The non-transitory computer-readable storage medium of claim 25 wherein the operations further comprise at least one of:
translating the at least one current text string into another language; or
converting the at least one current text string to audio.

27. The non-transitory computer-readable storage medium of claim 25, wherein the at least one current frame blob is similar to the at least one prior frame blob based on at least one of:
similarity in position within a respective frame,
similarity in orientation within a respective frame,
similarity in shape, or
similarity in content.

28. The non-transitory computer-readable storage medium of claim 25, wherein identifying, in the at least a portion of the current frame, at least one current text string using the at least one current frame blob, comprises:
grouping the at least one current frame blob designated as the at least one current character candidate and one or more other current character candidates into at least one current cluster of character candidates;
determining whether the at least one current cluster of character candidates is similar to at least one prior cluster of character candidates identified in the prior frame data;
in response to determining that the at least one current cluster of character candidates is similar to the at least one prior cluster of character candidates identified in the prior frame data, designating the at least one current cluster of character candidates as at least one current text candidate, without performing text candidate detection operations;
determining whether current text candidates comprising the at least one current cluster of character candidates designated as the at least one current text candidate are similar to prior text candidates identified in the prior frame data;
in response to determining that the current text candidates comprising the at least one current cluster of character candidates designated as the at least one current text candidate are similar to the prior text candidates identified in the prior frame data, designating the current text candidates as at least one current text string candidate, without performing text string candidate detection operations; and
determining that the current text candidates designated as the at least one current text string candidate is similar to at least one prior text string candidate identified in the prior frame data.

29. The non-transitory computer-readable storage medium of claim 25, wherein the detecting of the at least one current frame blob similar to the at least one prior frame blob identified in the prior frame data is based on at least one blob description in the prior frame data that comprises:
position of the at least one prior frame blob within the prior frame;
orientation of the at least one prior frame blob within the prior frame; and
shape of the at least one prior frame blob.

30. The non-transitory computer-readable storage medium of claim 28, wherein determining that the at least one current cluster of character candidates is similar to the at least one prior cluster of character candidates identified in the prior frame data is based on at least one character candidate description in the prior frame data that comprises:
position of the at least one prior cluster of character candidates within the prior frame;
orientation of the at least one prior cluster of character candidates within the prior frame; and
shape of the at least one prior cluster of character candidates.

31. The non-transitory computer-readable storage medium of claim 28, wherein determining that the current text candidates comprising the at least one current cluster of character candidates designated as the at least one current text candidate are similar to the prior text candidates identified in the prior frame data is based on at least one text candidate description in the prior frame data that comprises:
position of the prior text candidates within the prior frame;
orientation of the prior text candidates within the prior frame; and
shape of the prior text candidates.

32. The non-transitory computer-readable storage medium of claim 28, wherein determining that the current text candidates designated as the at least one current text string candidate is similar to the at least one prior text string candidate identified in the prior frame data is based on at least one text string description in the prior frame data that comprises:
position of the at least one prior text string within the prior frame;
orientation of the at least one prior text string within the prior frame; and
content of the at least one prior text string.

33. The non-transitory computer-readable storage medium of claim 25, wherein the processor used for processing of the at least a portion of the current frame and at least one processor used to generate the prior frame data are different processors.

34. The non-transitory computer-readable storage medium of claim 25, wherein the processor used for processing of the at least a portion of the current frame and at least one processor used to generate the prior frame data are different cores of a single multi-core processor.

35. The non-transitory computer-readable storage medium of claim 28, wherein the operations further comprise storing in the memory new frame data comprising at least one of:
the at least one current frame blob;
the at least one current character candidate;
the at least one current text candidate; or
the at least one current text string.

36. The non-transitory computer-readable storage medium of claim 28, wherein the operations further comprise at least one of:
- detecting in the at least a portion of the current frame at least one blob not similar to blobs described in the prior frame data;
- detecting in the at least a portion of the current frame at least one character candidate not similar to character candidates described in the prior frame data;
- detecting in the at least a portion of the current frame at least one text candidate not similar to text candidates described in the prior frame data; or
- detecting in the at least a portion of the current frame at least one text string not similar to text strings described in the prior frame data.

* * * * *